No. 830,956. PATENTED SEPT. 11, 1906.
P. E. BAGGE.
LOCK NUT.
APPLICATION FILED JAN. 19, 1906.
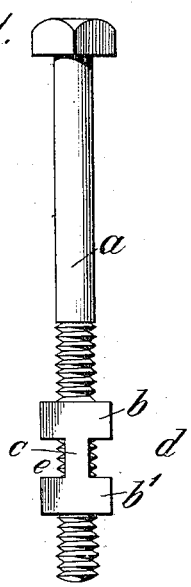
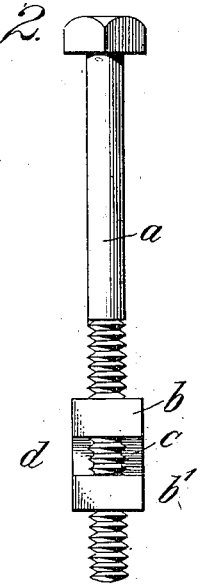
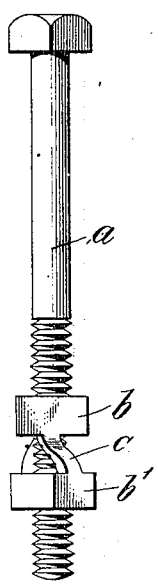
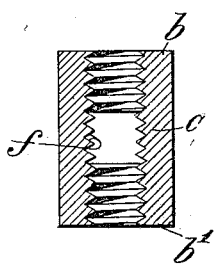
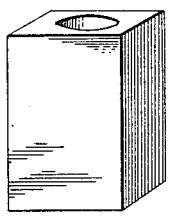
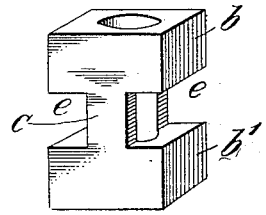
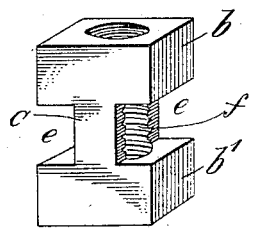
Witnesses
Paul J. Gathmann
N. Curtis Lammond
Inventor
P. E. Bagge.
By H. H. Bliss
his Attorney

UNITED STATES PATENT OFFICE.

PETER E. BAGGE, OF MOLINE, ILLINOIS.

LOCK-NUT.

No. 830,956.

Specification of Letters Patent.

Patented Sept. 11, 1906.

Application filed January 19, 1906. Serial No. 296,852.

*To all whom it may concern:*

Be it known that I, PETER E. BAGGE, a citizen of the United States, residing at Moline, in the county of Rock Island and State of Illinois, have invented certain new and useful Improvements in Lock-Nuts, of which the following is a specification, reference being had therein to the accompanying drawings.

My invention relates to that class of lock-nuts in which for the purpose of securing a rigid or tight engagement of the nut with the screw the former is distorted, causing such binding of the screw-threads of the nut and the screw as to prevent the accidental or unintentional movement of one relative to the other.

In the accompanying drawings, Figure 1 is a side view of a lock-nut embodying my invention applied to a screw. Fig. 2 is a side view of the same parts, the nut being turned one-quarter around as compared with the position represented in Fig. 1. Fig. 3 is a view of the same nut when distorted to cause a locking engagement thereof with the screw. Fig. 4 is a longitudinal sectional view of the nut. Figs. 5, 6, and 7 are perspective views illustrating several steps in the making of a nut embodying my invention.

In the accompanying drawings, *a* designates a screw-threaded bolt adapted to have applied to it a lock-nut of the character embodying my invention. It may be of usual construction in all particulars.

The nut which I have invented is considerably longer than the nuts in common use, preferably about two or three times as long; and it consists of two screw-threaded parts *b b'*, united by pillars *c*. Each of the parts *b b'* is similar in construction to an ordinary nut, being internally screw-threaded, as indicated. The pillars or parts *c*, that connect the two nut portions *b b'*, are preferably arranged diametrically opposite each other and are separated by the open spaces *e e*. The inner faces or walls of the pillars *c* are formed with screw-threads *f*, the pitch corresponding with the pitch of the threads in the parts *b b'* and arranged to engage with the threads of the bolt *a*.

In Figs. 5, 6, and 7 I have illustrated the steps employed in the manufacture of a nut such as I have described. In Fig. 5 is represented the blank from which the nut is formed. It in no wise differs from an ordinary nut-blank, except for its greater length, being preferably, as already stated, two or three times as long as the ordinary nut. In Fig. 6 the nut-blank is represented as having been cut away on either side at *e e* to form the connecting-pillars between the end portions of the nut. The blank thus formed is then screw-threaded, forming the complete nut represented in Fig. 7, which may be applied to a screw-bolt the same as may an ordinary nut. In order to transform the nut shown in Fig. 7 to a locking-nut like that represented in Fig. 3, one of the end parts *b* or *b'* of the nut is turned relative to the other part, with the result that the connecting-pillars *c* are twisted or distorted and the pitch of the screw-threads on the inner faces of the pillars are so changed that they will not accurately register with the threads of the bolt. This causes a binding action to take place between the threads of the pillars and those of the bolt.

The locking efficiency of the nut may be controlled by the extent to which the nut is distorted, a slight turning of one of the portions *b b'* relative to the other causing but a slight locking frictional engagement between the pillars or posts of the nut and the bolt-threads, while a greater relative movement of these parts will result in a greater distortion of the threads *f* and a consequently tighter grip or bind between the nut and the bolt.

The nut may be distorted, as represented in Fig. 3, before it is applied to the bolt, for which purpose specially-devised machinery may be employed, or the distortion may take place after the nut has been applied to the bolt, as indicated in Figs. 1 and 2. When the nut is distorted while in place upon the bolt, one of the end sections *b* is engaged by a suitable holding-wrench and the other engaged by another wrench to which sufficient power is applied to cause a yielding and distortion of the connecting parts *c*.

I am aware that it has heretofore been proposed to produce lock-nuts wherein one end portion was turned relative to the other for the purpose of distorting the intermediate or middle portion of the nut; but in all such earlier constructions of which I have knowledge it has been impracticable to produce the distortion, and consequently the locking of the nut, after it is applied to the bolt. This I can accomplish with a nut constructed as I have described and illustrated.

It is evident that the size of the connecting pillars or posts c may be varied. Where a relatively feeble locking effect only is required and where the nut is to be distorted after being screwed in place upon the bolt, the pillars will be smaller than where a more powerful lock is required or where the nuts are distorted by specially-designed machinery before being applied to the bolt.

In order that the pillars may be distorted as described, they should be relatively high, and I have shown them of a height approximately equal to the thickness of the sections b' of the nut, these being the preferred relations of the several parts of the nut to each other so far as longitudinal dimensions are concerned.

While I have represented the nut as being formed with but two pillars, I do not wish to be understood as claiming that my invention is limited to the use of this particular number, as more than two can be employed if it be found desirable.

What I claim is—

1. A lock-nut having the end sections b, b' internally screw-threaded and the connecting pillars or posts c c the inner faces of which are screw-threaded, the height of the pillars being approximately equal to the thickness of the sections b b'.

2. A lock-nut comprising end sections b b', and a plurality of connecting posts or pillars c, both said sections and the pillars being internally screw-threaded to engage with a bolt, and the cross-sectional area of the pillars or connecting parts being materially less than the cross-sectional area of the end sections b and b' and the height of such pillars being approximately equal to the thickness of the end sections, substantially as set forth.

3. A lock-nut comprising the internally-screw-threaded end sections b, b', and the connecting pillars or posts c, the latter being screw-threaded and distorted, substantially as set forth.

4. A lock-nut having end sections b, b', and the connecting posts or pillars c, said parts being internally screw-threaded and the said end parts being turned, about the axis of the nut, relative to each other, whereby the connecting pillars or posts are twisted and distorted, substantially as set forth.

5. A lock-nut comprising end sections separated from each other by spaces e, and the pillars or posts connecting the end sections of the nut and of less sectional area than the area of the nuts, the said connecting pillars or posts being distorted by a turning of one of the end sections of the nut relative to the other, whereby they are caused to engage with and bind upon the screw-threads of the bolt to which the nut may be applied, substantially as set forth.

In testimony whereof I affix my signature in presence of two witnesses.

PETER E. BAGGE.

Witnesses:
CARL LARSON,
OLOF NELSON.